United States Patent
Endo et al.

(10) Patent No.: US 11,946,764 B2
(45) Date of Patent: Apr. 2, 2024

(54) VEHICLE DISPLAY CONTROL DEVICE AND VEHICLE DISPLAY CONTROL METHOD

(71) Applicant: TOYOTA JIDOSHA KABUSHIKI KAISHA, Aichi-ken (JP)

(72) Inventors: Masato Endo, Nagoya (JP); Yasuyuki Kamezaki, Toyota (JP); Yasuhiro Murata, Toyota (JP); Takeo Moriai, Nagakute (JP); Kosuke Sakakibara, Toyota (JP); Kenta Miyahara, Okazaki (JP); Takashi Hayashi, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/839,381

(22) Filed: Jun. 13, 2022

(65) Prior Publication Data
US 2023/0028990 A1   Jan. 26, 2023

(30) Foreign Application Priority Data
Jul. 26, 2021 (JP) .................. 2021-122030

(51) Int. Cl.
*G01C 21/36* (2006.01)
*B60K 35/00* (2006.01)
*G01C 21/34* (2006.01)
*G06T 11/00* (2006.01)

(52) U.S. Cl.
CPC ....... *G01C 21/365* (2013.01); *G01C 21/3415* (2013.01); *G01C 21/3461* (2013.01); *G06T 11/00* (2013.01); *B60K 35/00* (2013.01); *B60K 2370/166* (2019.05)

(58) Field of Classification Search
None
See application file for complete search history.

(56) References Cited

U.S. PATENT DOCUMENTS

| | | | |
|---|---|---|---|
| 2005/0027448 A1* | 2/2005 | Takenaga | G08G 1/09675 340/995.13 |
| 2017/0154554 A1* | 6/2017 | Tanaka | B60K 35/00 |
| 2019/0213422 A1* | 7/2019 | Funagi | G06Q 30/0281 |
| 2020/0223360 A1* | 7/2020 | Bruno | A63G 7/00 |
| 2021/0039495 A1* | 2/2021 | Kondo | B60K 35/00 |
| 2021/0223058 A1* | 7/2021 | Horihata | G01C 21/3635 |
| 2022/0184499 A1* | 6/2022 | Wilson | A63F 13/798 |
| 2022/0289224 A1* | 9/2022 | Yoshida | B60W 30/0956 |
| 2023/0014553 A1* | 1/2023 | Homma | G06T 5/005 |

FOREIGN PATENT DOCUMENTS

JP   2004344352 A   12/2004

* cited by examiner

*Primary Examiner* — James A Thompson
*Assistant Examiner* — Kim Thanh T Tran
(74) *Attorney, Agent, or Firm* — HAUPTMAN HAM, LLP (57) ABSTRACT

A vehicle display control device includes: a map information acquisition unit that acquires map data around a vehicle; and an item display unit that overlaps a virtual item on a predetermined travel road on the map data and that displays the virtual item in a display area in a vehicle cabin. The item display unit overlaps and displays the virtual item on the map data, thereby guiding a driver of the vehicle toward the travel road on which the virtual item is displayed.

11 Claims, 8 Drawing Sheets

VEHICLE DISPLAY CONTROL DEVICE AND VEHICLE DISPLAY CONTROL METHOD

CROSS-REFERENCE TO RELATED APPLICATION

This application claims priority to Japanese Patent Application No. 2021-122030 filed on Jul. 26, 2021, incorporated herein by reference in its entirety.

BACKGROUND

1. Technical Field

The present disclosure relates to a vehicle display control device and a vehicle display control method.

2. Description of Related Art

Japanese Unexamined Patent Application Publication No. 2004-344352 (JP 2004-344352 A) discloses a game device using map data of a navigation system. Specifically, in the game device of JP 2004-344352 A, a game screen is constructed based on a driving history when traveling on a set route.

SUMMARY

However, in the game device described in JP 2004-344352 A, since the traveling history of the vehicle is used, the game cannot be played while traveling. In addition, there is room for improvement from the viewpoint of using the device for purposes other than entertainment.

An object of the present disclosure is to obtain a vehicle display control device and a vehicle display control method capable of naturally guiding a vehicle while adding an entertainment element while the vehicle is traveling.

A vehicle display control device according to a first aspect of the present disclosure includes: a map information acquisition unit that acquires map data around a vehicle; and an item display unit that overlaps a virtual item on a predetermined travel road on the map data and that displays the virtual item in a display area in a vehicle cabin.

In the first corresponding vehicle display control device, the map data around the vehicle is acquired by the map information acquisition unit. The item display unit overlaps a virtual item on the travel road on the map data and displays it in a display area of the vehicle cabin. As a result, the driver (user) of the vehicle can be guided toward the travel road on which the virtual item is displayed. On the other hand, since the driver of the vehicle travels while being guided while having fun, they do not feel uncomfortable even when they change their course.

In the first aspect, the item display unit may overlap the virtual item on a traffic jam detour route that bypasses a traffic jam.

The vehicle display control device described above can guide the vehicle to the detour route without impairing the driver's comfortability.

In the aspect described above, the item display unit may overlap the virtual item on an accident-prone zone detour route that bypasses a preset route with a high accident occurrence rate.

The vehicle display control device described above having the above configuration can improve safety by encouraging detours of accident-prone areas.

The aspect described above may further include: a counting unit that counts the number of times a current position of the vehicle on the map data overlaps with the virtual item; and an incentive giving unit that gives an incentive to a user of the vehicle based on a point calculated in accordance with the number of times counted by the counting unit.

In the vehicle display control device having the above configuration, points are calculated in accordance with the number of times the vehicle overlaps with the virtual item. In addition, since the incentive based on the points is given to the user by the incentive giving unit, it is possible to increase the motivation of the user of the vehicle toward the virtual item. The incentive here is a concept that broadly includes measures to encourage users to collect points, such as applying points to a part of a purchase price of a predetermined product, and discounting the purchase price by the amount of points.

In the aspect described above, the item display unit may overlap and display a plurality of kinds of the virtual items, and the incentive giving unit may calculate the point by multiplying the number of times counted by the counting unit by a coefficient set for each of the kinds of the virtual items.

In the vehicle display control device of the configuration described above, by displaying a plurality of kinds of virtual items, it is possible to suppress the user from getting bored. Further, by selecting the kind of the virtual item in accordance with the priority of the travel road to be guided, it is possible to make the vehicle travel on the travel road on which it is desired to guide the vehicle to.

In the aspect described above, a notification unit that notifies a user of the vehicle when a current position of the vehicle on the map data overlaps with the virtual item may be further provided.

With the vehicle display control device of the above configuration, it is possible to make the user realize that the vehicle has acquired the virtual item.

A vehicle display control device according to a second aspect of the present disclosure includes: acquiring map data around a vehicle; and overlapping an image imitating a virtual item on a travel road on the map data and displaying the image in a display area in a vehicle cabin.

As described above, with a vehicle display control device and a vehicle display control method according to the present disclosure, it is possible to naturally guide a vehicle while adding an entertainment element during traveling of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle display control device 10 according to an embodiment will be described with reference to the drawings.

Figure 1:
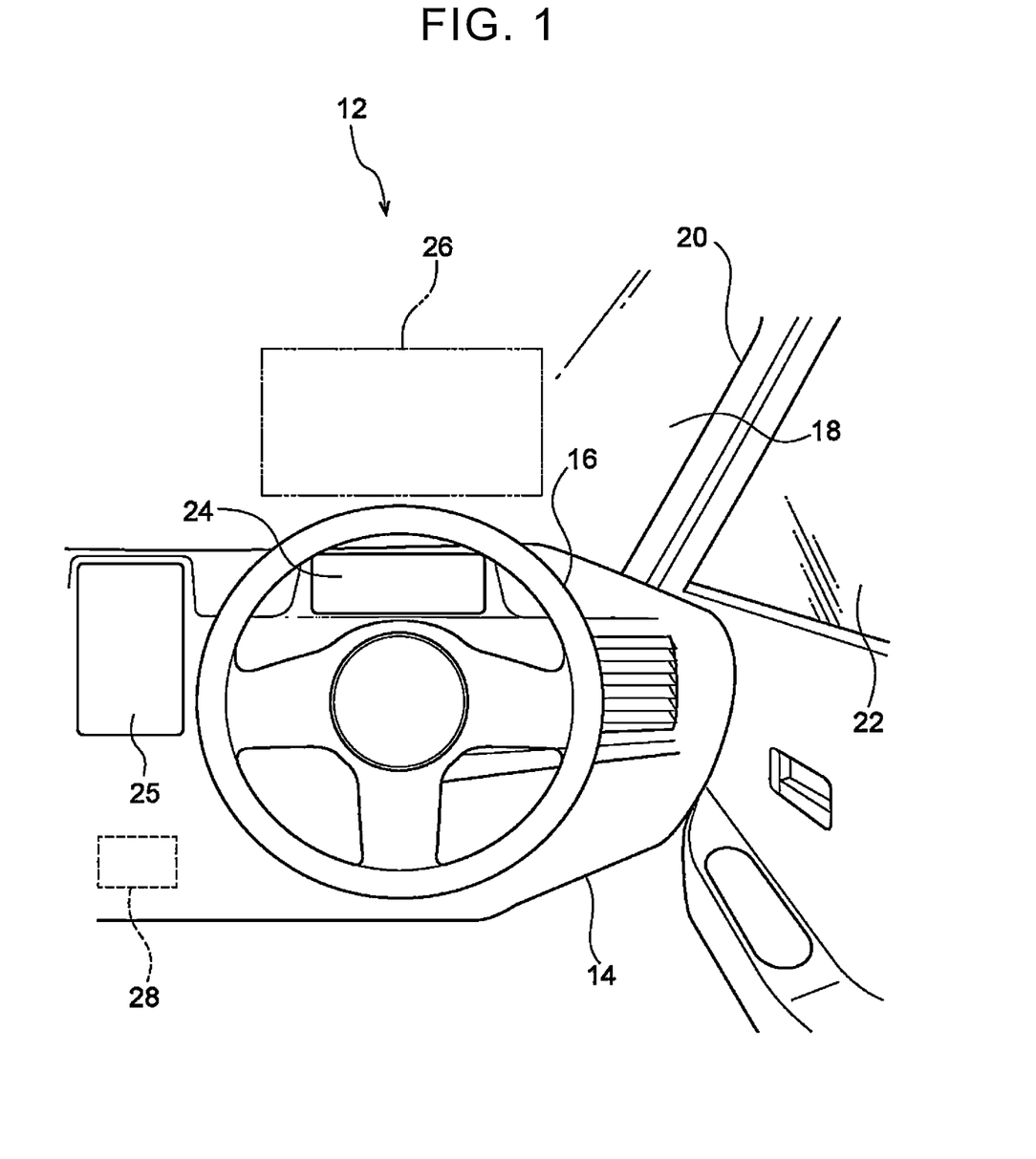
FIG. 1 is a schematic view of a front portion of a vehicle cabin of a vehicle to which a vehicle display control device according to an embodiment is applied, as viewed from the rear side of the vehicle.

As shown in FIG. 1, an instrument panel 14 is provided at a front portion of the vehicle cabin of a vehicle 12. The instrument panel 14 extends in a vehicle width direction, and a steering wheel 16 is provided on the vehicle right side on the instrument panel 14. That is, in the present embodiment, as an example, the vehicle is a right steering wheel vehicle in which the steering wheel 16 is provided on the vehicle right side, and a driver's seat is set on the vehicle right side.

A windshield glass 18 is provided at the front end of the instrument panel 14. The windshield glass 18 extends in the vehicle vertical direction and the vehicle width direction to separate the inside of the vehicle cabin and the outside of the vehicle cabin.

The vehicle right end portion of the windshield glass 18 is fixed to a front pillar 20 on the vehicle right side. The front pillar 20 extends in the vertical direction of the vehicle, and the windshield glass 18 is fixed to the inner end portion of the front pillar 20 in the vehicle width direction. Further, the front end portion of the front side glass 22 is fixed to the outer end portion of the front pillar 20 in the vehicle width direction. The vehicle left end portion of the windshield glass 18 is fixed to the front pillar on the vehicle left side (not shown).

Here, the instrument panel 14 is provided with a first display area 24. The first display area 24 is provided on the vehicle right side of the instrument panel 14, on the vehicle front side of a driver's seat, and is an area in which a predetermined image is displayed by a meter display device 44 (see FIG. 2). The first display area 24 is connected to various meter devices mounted on the vehicle 12, and is provided at a position where the driver can see the first display area 24 when their line of sight is directed to the front of the vehicle.

A second display area 25 is provided at a center portion of the instrument panel 14 in the vehicle width direction. As an example, the second display area 25 of the present embodiment is an area that is formed in a substantially rectangular shape in which a vertical direction is set as a longitudinal direction, and is an area in which a predetermined image is displayed by a center display device 46 (see FIG. 2).

The windshield glass 18 is provided with a third display area 26. The third display area 26 is set on a vehicle upper side of the first display area 24, and is composed of a projection surface projected by the head-up display device 48 (see FIG. 2). Specifically, the head-up display device 48 is provided on the vehicle front side of the instrument panel 14, and is configured such that an image is projected from the head-up display device 48 onto the third display area 26 of the windshield glass 18. That is, the third display area 26 is set as a part of the windshield glass 18 that is the projection surface of the head-up display device 48.

Here, the vehicle 12 is provided with the vehicle display control device 10. The vehicle display control device 10 of the present embodiment is, for example, an electronic control unit (ECU) that performs various controls. Then, the vehicle display control device 10 of the present embodiment naturally guides the vehicle 12 by overlapping a virtual item on map data displayed in at least one display area among the first display area 24, the second display area 25, and the third display area 26.

Hardware Configuration of Vehicle Display Control Device 10

Figure 2:
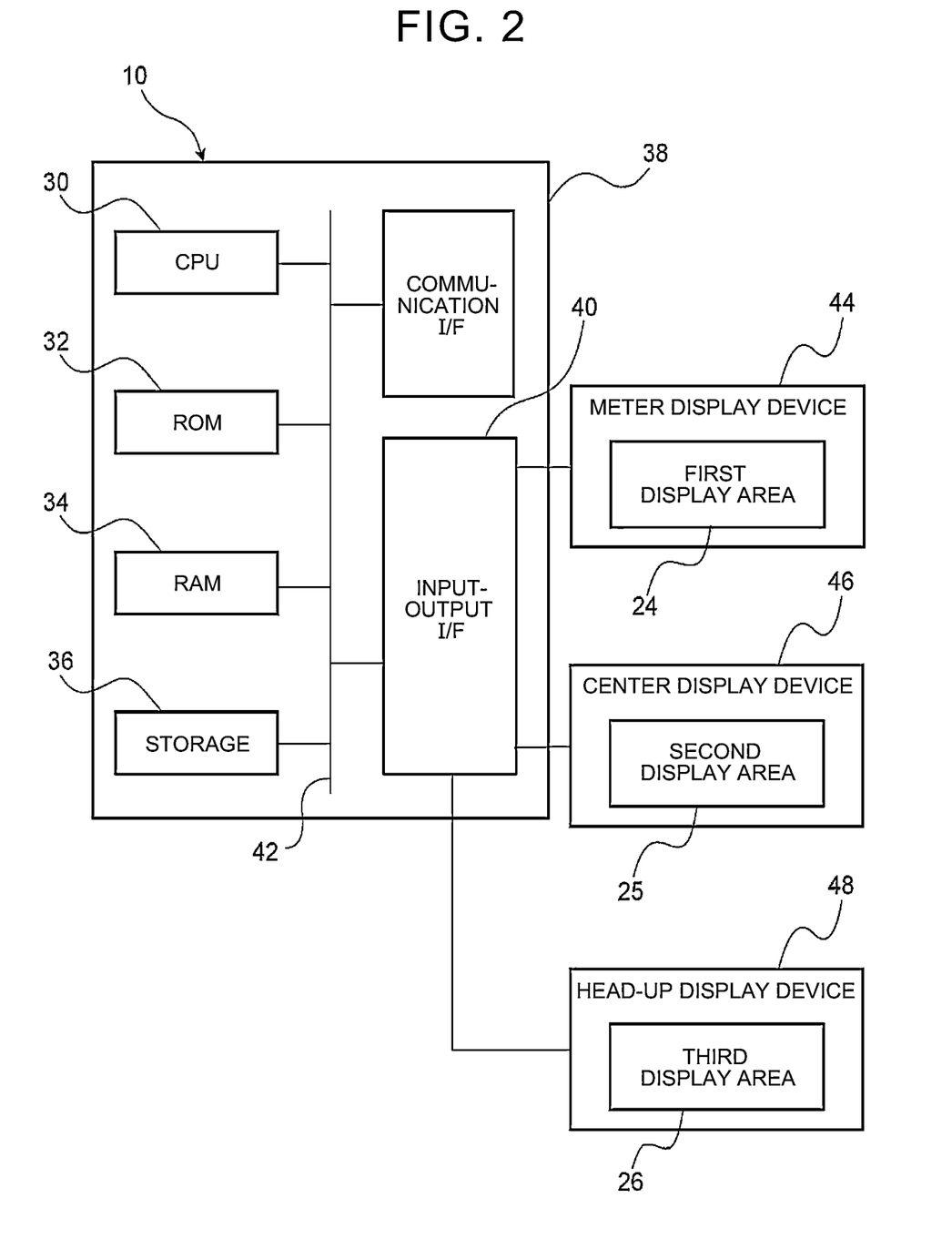
FIG. 2 is a block diagram showing a hardware configuration of a vehicle display control device according to the embodiment.

FIG. 2 is a block diagram showing a hardware configuration of the vehicle display control device 10. As shown in FIG. 2, the vehicle display control device 10 is configured to include a central processing unit (CPU: processor) 30, a read only memory (ROM) 32, a random access memory (RAM) 34, a storage 36, a communication interface 38, and an input-output interface (input-output I/F) 40. Each configuration is communicably connected to each other via a bus 42.

The CPU 30 is a central processing unit that executes various programs and that controls various units. That is, the CPU 30 reads the program from the ROM 32 or the storage 36 and executes the program using the RAM 34 as a work area. The CPU 30 controls each of the above configurations and performs various arithmetic processes in accordance with the program recorded in the ROM 32 or the storage 36.

The ROM 32 stores various programs and various data. The RAM 34 temporarily stores a program or data as a work area. The storage 36 is composed of a hard disk drive (HDD) or a solid state drive (SSD), stores various programs including an operating system, and stores various data. In the present embodiment, the ROM 32 or the storage 36 stores a program that performs a virtual item display process and an incentive giving process, various data, and the like.

The communication interface 38 is an interface for the vehicle display control device 10 to communicate with an external server and other devices, and for example, standards such as a controller area network (CAN), Ethernet (registered trademark), long term evolution (LTE), fiber distributed data interface (FDDI), and Wi-Fi (registered trademark) are used.

The input-output I/F 40 is electrically connected to the meter display device 44, the center display device 46, and the head-up display device 48. The meter display device 44 causes the first display area 24 to display predetermined information. The center display device 46 causes the second display area 25 to display predetermined information. The head-up display device 48 causes the third display area 26 to display predetermined information.

Functional Configuration of Vehicle Display Control Device 10

The vehicle display control device 10 realizes various functions by using the above hardware resources. The functional configuration realized by the vehicle display control device 10 will be described with reference to FIG. 3.

Figure 3:
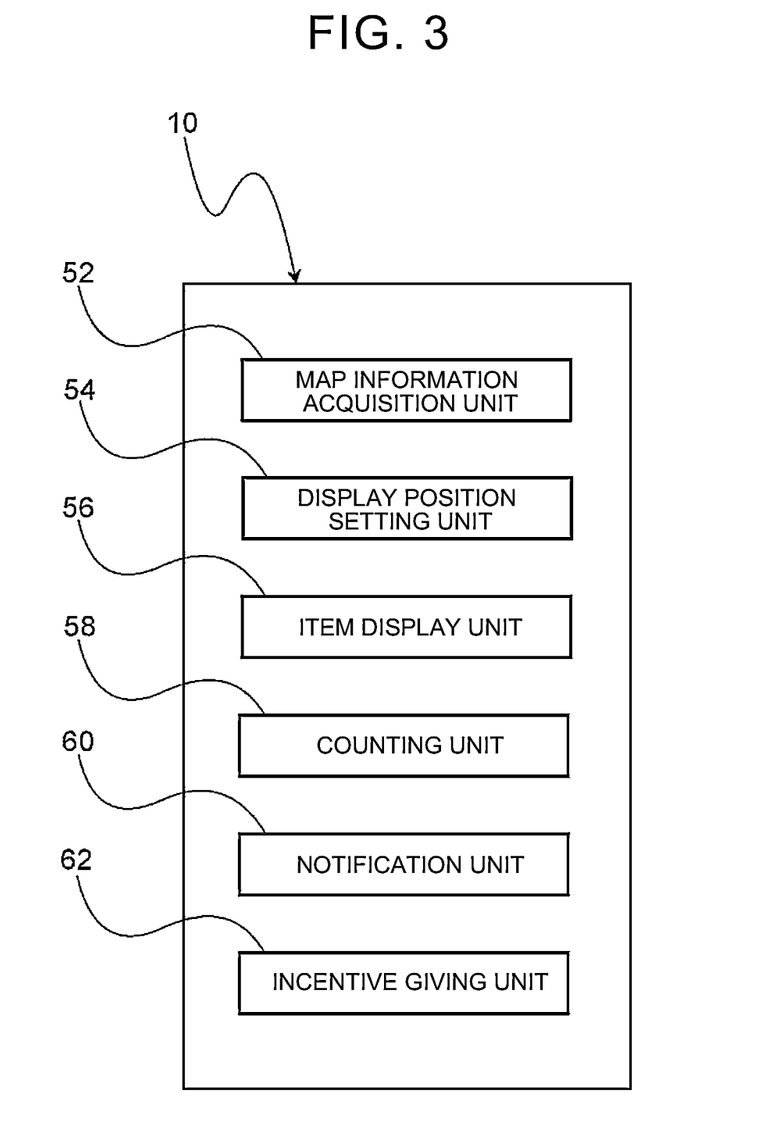
FIG. 3 is a block diagram showing an example of a functional configuration of the vehicle display control device according to the present embodiment.

As shown in FIG. 3, the vehicle display control device 10 is configured to include a map information acquisition unit 52, a display position setting unit 54, an item display unit 56, a counting unit 58, a notification unit 60, and an incentive giving unit 62 as functional configurations. Each functional configuration is realized by the CPU 30 reading and executing the program stored in the ROM 32 or the storage 36.

The map information acquisition unit 52 acquires map data around the vehicle. Specifically, the map information acquisition unit 52 acquires the map data around the current position of the vehicle 12 specified based on a signal from a global positioning system (GPS) sensor (not shown) from the external server or the like. Further, when a high-precision map is stored in the internal storage of the vehicle 12, the map information acquisition unit 52 may acquire the map information from the internal storage.

The display position setting unit 54 sets a position for displaying the virtual item. Specifically, the display position setting unit 54 sets the display position of the virtual item in accordance with a priority of a travel road when the travel road is branched. For example, when the travel road is branched into two, the display position setting unit 54 sets the virtual item to be displayed on the travel road to which the vehicle 12 is to be guided, that is, the travel road having a high priority.

Here, the priority of the travel road is determined based on various information. For example, it is determined based on traffic congestion information, accident information, road surface information, requests from business operators, and the like. When determining the priority of the travel route based on the traffic congestion information, the priority of the travel route where congestion is likely to occur is lowered, and the priority of the travel route where congestion is less likely to occur is increased.

When determining the priority of the travel route based on the accident information, the priority of the travel route where an accident is likely to occur is lowered, and the priority of the travel route where an accident is less likely to occur is increased.

When determining the priority of the travel road based on the road surface information, the priority is lowered for a road where the road surface is slippery, a road has a steep slope, and a rough road in which a large vibration occurs, and the priority is raised for a travel road that is safe and comfortable to travel on.

When determining the priority of the travel road based on the request from the business operator, the business operator registers the travel road to be driven by many vehicles in a database (not shown) in order to promote regional promotion. Then, the priority of the registered travel road is raised. Similarly, requests may be individually received from a store to raise the priority of the road facing the store.

The item display unit 56 overlaps a virtual item on a predetermined travel road on the map data and displays it in a display area of the vehicle cabin. In the present embodiment, as an example, a case where a virtual item is overlapped and displayed on the second display area 25 will be described.

Figure 4:
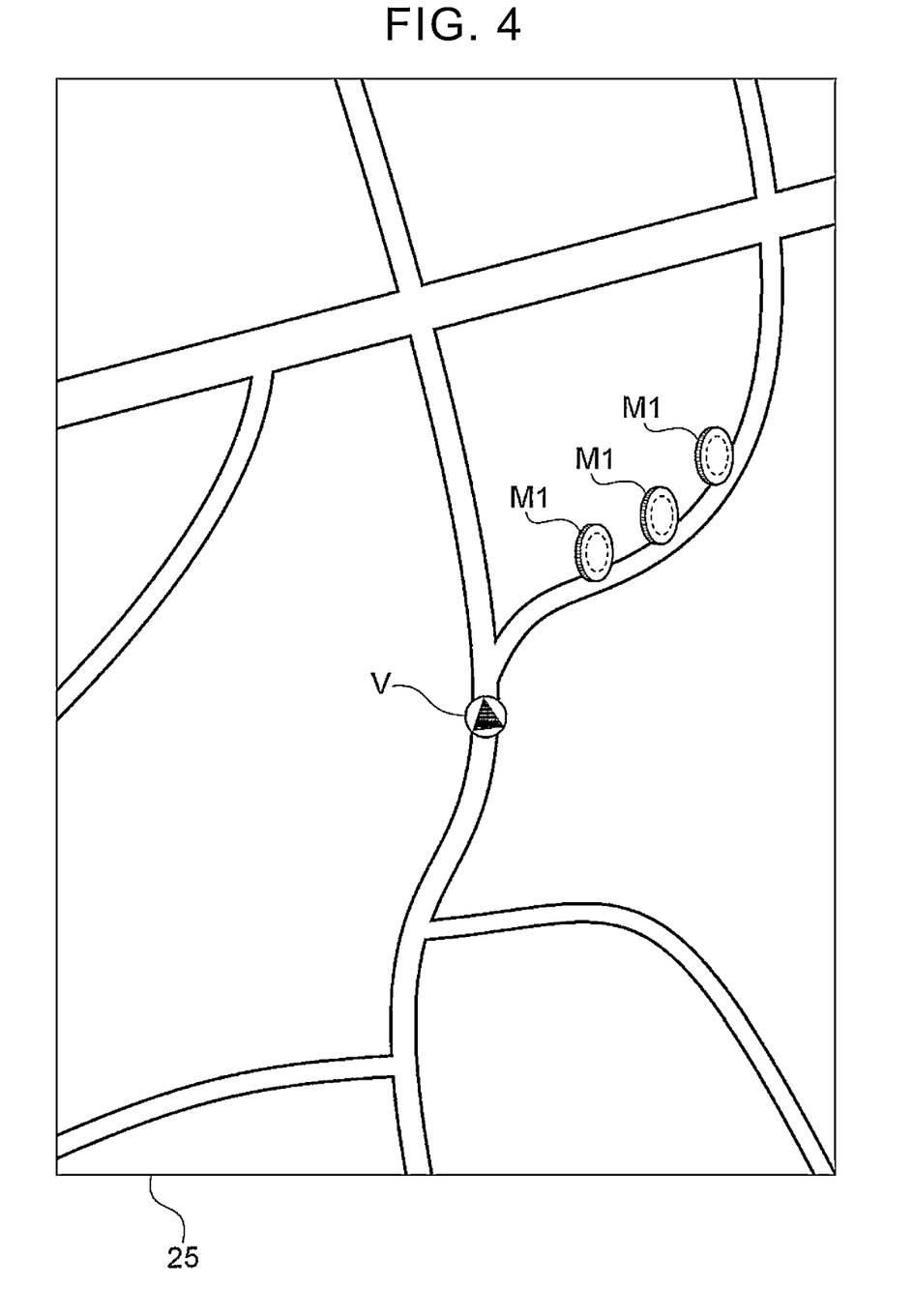
FIG. 4 is a diagram showing a display example by a center display device according to the embodiment.

FIG. 4 is a display example displayed in the second display area 25 by the center display device 46. As shown in FIG. 4, the map data around the vehicle 12 is displayed in the second display area 25. Further, the current position of the vehicle 12 is displayed as an icon V on the map data. Here, as an example, a traveling direction of the vehicle 12 is the upper side in the figure.

In the traveling direction of the vehicle 12, there is a branch travel road branched from the main travel road, and three virtual items M1 imitating coins are displayed on the branch travel road. That is, the branch travel road is regarded as a road having a higher priority than the main travel road. For example, when the branch travel road is a detour road that bypasses a traffic jam, the item display unit 56 overlaps and displays the virtual items M1 on the detour route in accordance with the display position set by the display position setting unit 54.

Further, for example, when the main driving road includes an accident-prone area with a high accident occurrence rate, the item display unit 56 overlaps and displays the virtual items M1 on the branch travel road bypassing the accident-prone area in accordance with the display position set by the display position setting unit 54.

Figure 5:
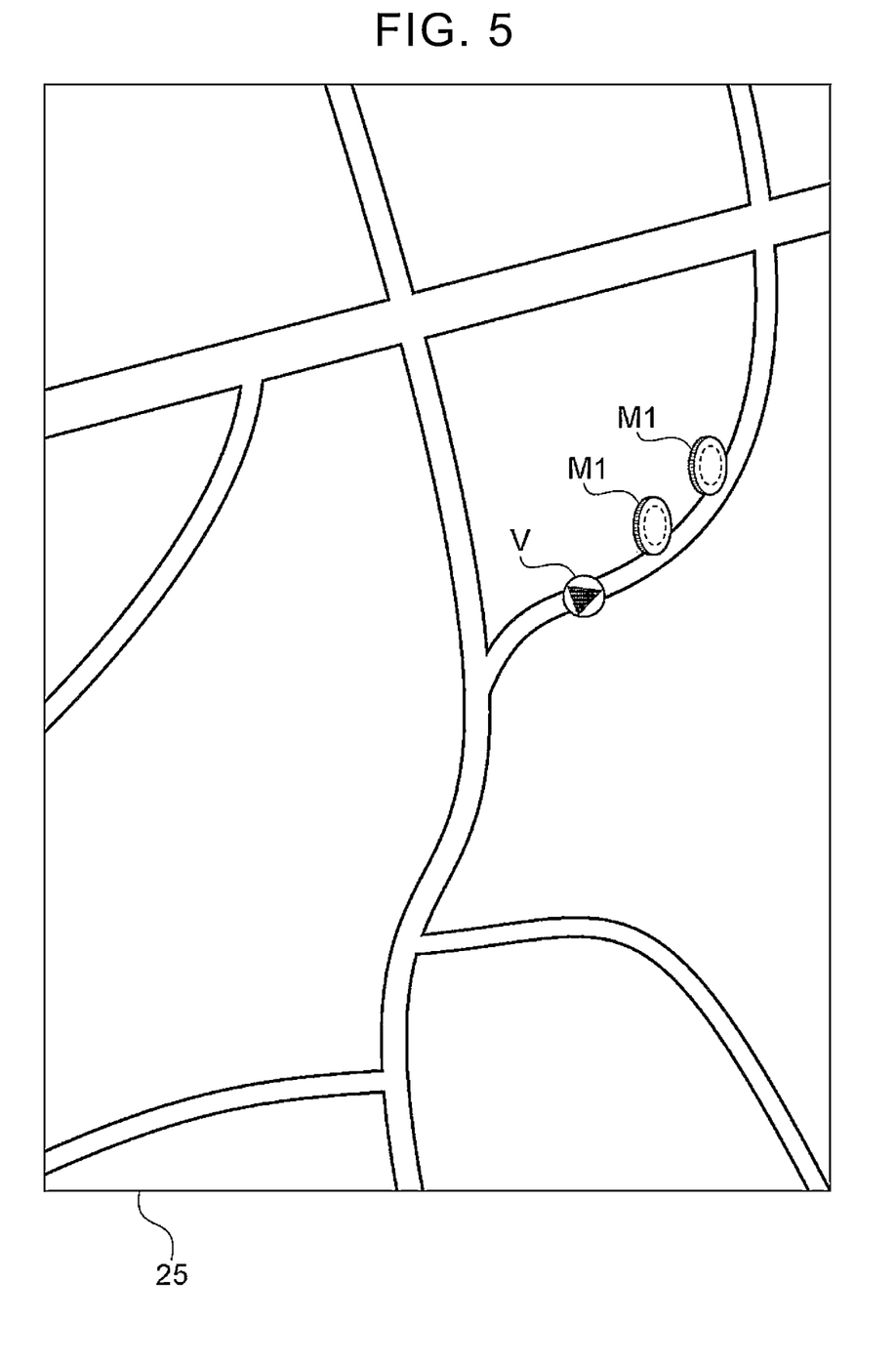
FIG. 5 is a diagram showing a display example by the center display device according to the embodiment, and shows a state in which a predetermined time has elapsed from FIG. 4.

Here, the item display unit 56 erases the display of the virtual items M1 when the current position of the vehicle 12 overlaps with the virtual items M1. Specifically, when the vehicle 12 advances from the state of FIG. 4 to the branch travel road and the foremost virtual item M1 and the icon V indicating the current position of the vehicle 12 overlap, as shown in FIG. 5, the display of the virtual item M1 is erased. By erasing the display of the virtual item M1 in this way, the user can intuitively understand that the vehicle 12 has acquired the virtual item M1.

Figure 6:
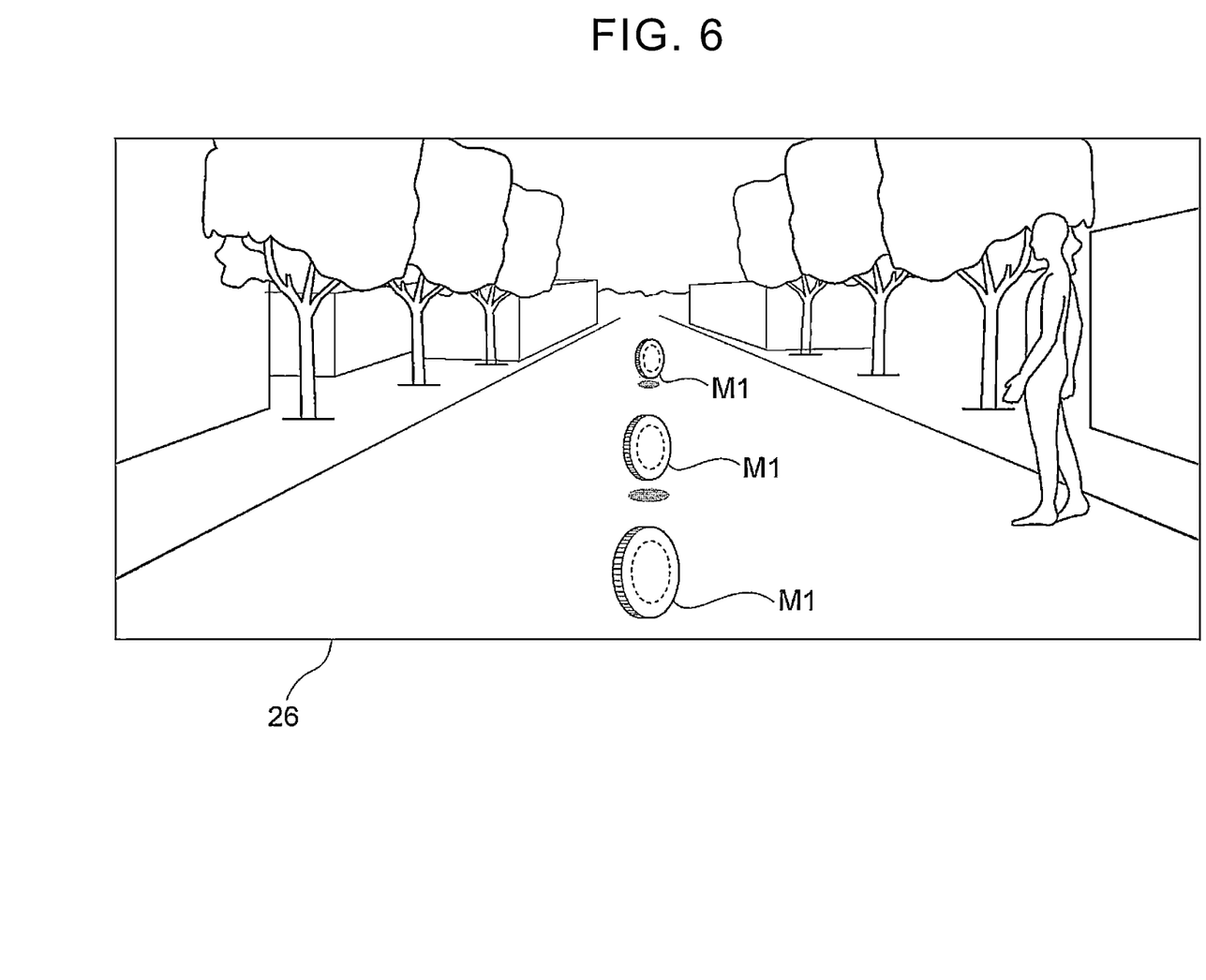
FIG. 6 is a diagram showing a display example by the center display device according to the embodiment.

Further, the item display unit 56 of the present embodiment also displays a virtual item in the third display area 26 shown in FIG. 1. Specifically, as shown in FIG. 6, in the third display area 26, a real landscape is visible through the windshield glass 18, and the virtual items M1 are overlapped and displayed on the actual landscape.

Here, the head-up display device 48 of the present embodiment is an augmented reality head-up display. Thus, the virtual items M1 are displayed on the virtual space set in the third display area 26 so that a sense of depth can be acquired, and the virtual item M1 in the back is displayed smaller than the virtual item M1 in the front.

In FIG. 3, the counting unit 58 counts the number of times the current position of the vehicle 12 on the map data overlaps with the virtual item. Specifically, as shown in FIG. 5, when the icon V indicating the current position of the vehicle 12 overlaps with the virtual item M1, the item display unit 56 erases the display of the virtual item M1 while the counting unit 58 increases the number of times the virtual item M1 is acquired by 1. The number of times counted by the counting unit 58 is stored in the storage 36 or the like, and is updated at any time.

In FIG. 3, the notification unit 60 notifies the user of the vehicle when the current position of the vehicle on the map data overlaps with the virtual item. In the present embodiment, as an example, the notification unit 60 notifies the user by outputting a predetermined sound from a speaker (not shown) provided in the vehicle cabin. When the virtual item M1 is an image imitating a coin as in the present embodiment, the notification unit 60 outputs a sound associated with the coin.

The incentive giving unit 62 gives an incentive to the user of the vehicle based on the points calculated in accordance with the number of times counted by the counting unit 58. Specifically, the incentive giving unit 62 calculates the points in accordance with the number of times the virtual item M1 is acquired that is counted by the counting unit 58. Then, the points are given to the user at predetermined intervals as usable points.

In the present embodiment, as an example, the incentive giving unit 62 gives the calculated points to the user as points that can be allocated to a part of a purchase price of a predetermined product.

Effect

Next, the effect of the present embodiment will be described.

Example of Virtual Item Display Process

Figure 7:
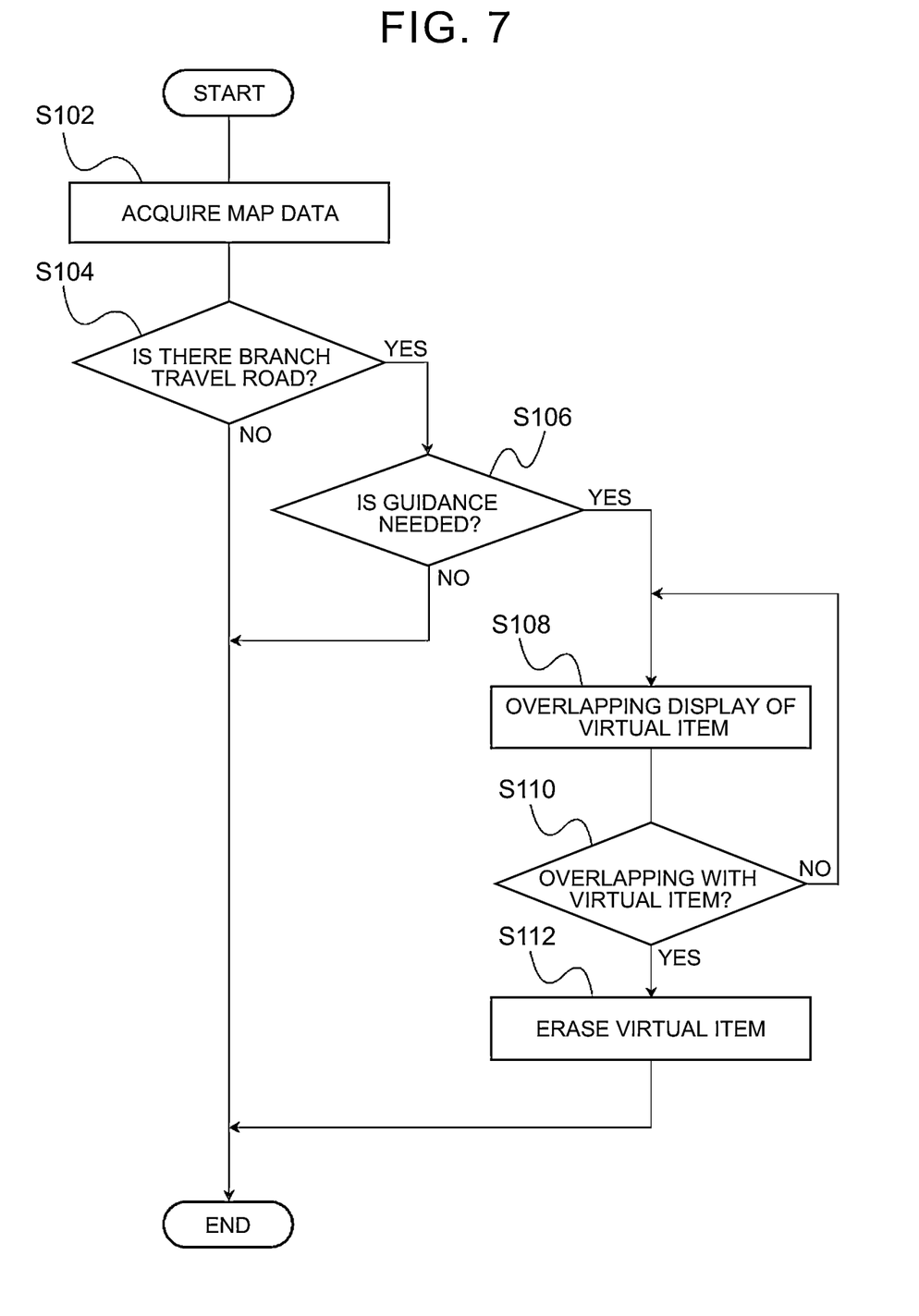
FIG. 7 is a flowchart showing an example of a flow of a virtual item display process in the embodiment.

An example of the virtual item display process in the vehicle display control device 10 in accordance with the present embodiment will be described with reference to the flowchart shown in FIG. 7. This virtual item display process is executed by the CPU 30 reading a program from the ROM 32 or the storage 36 and expanding it to the RAM 34. Further, it is executed when the power unit of the vehicle 12 is turned on.

The CPU 30 acquires the map data in step S102. Specifically, the CPU 30 acquires the map data around the current position of the vehicle 12 from the external server or the internal storage, by the function of the map information acquisition unit 52.

The CPU 30 determines in step S104 whether there is a branch travel road. Specifically, when the branch travel road is in the traveling direction of the vehicle 12 from the map data, the CPU 30 affirms the determination in step S104 and shifts to the process of step S106. On the other hand, when the CPU 30 does not have a branch travel road in the traveling direction of the vehicle 12, the determination in step S104 is denied and the virtual item display process is ended.

The CPU 30 determines whether it is necessary to guide the vehicle 12 in step S106. Specifically, when it is necessary to guide the vehicle 12 to the main travel road or the branch travel road based on the traffic congestion information, the accident information, the road surface information, the request from the business operator, and the like, the CPU 30 affirms the determination in step S106 and proceeds to the process in step S108. On the other hand, when the CPU 30 determines that it is not necessary to guide the vehicle 12, the determination in step S106 is denied and the virtual item display process is terminated.

The CPU 30 overlaps and displays the items in step S108. Specifically, the CPU 30 overlaps the virtual items M1 on the predetermined travel road on the map data and displays it in the second display area 25 by the function of the item display unit 56 (see FIG. 4). Further, the CPU 30 causes the virtual items M1 to be displayed in the third display area 26 by the function of the item display unit 56 (see FIG. 6).

Subsequently, the CPU 30 determines in step S110 whether the virtual item M1 and the current position of the vehicle 12 are overlapped. Specifically, as shown in FIG. 5, when the icon V indicating the current position of the vehicle 12 on the map data overlaps with the virtual item M1, the CPU 30 affirms the determination in step S110 and proceeds to step S112. On the other hand, when the icon V and the virtual item M1 do not overlap, the CPU 30 returns to the process of step S108.

The CPU 30 erases the display of the virtual item M1 in step S112. Specifically, by the function of the item display unit 56, the CPU 30 erases only the virtual item M1 that overlaps with the icon V. Then, the CPU 30 ends the virtual item display process. When the vehicle 12 travels straight on the main travel road without traveling to the branch travel road, the virtual items M1 overlapped and displayed on the map data are erased with the branch travel road when the branch travel road from the second display area 25 is no longer displayed as the vehicle 12 moves.

As described above, in the vehicle display control device 10 of the present embodiment, by making the virtual items M1 overlap the travel road on the map data and displaying them in the second display area 25 by the item display unit 56, the driver of the vehicle 12 can be guided to select a travel path toward the virtual items M1. On the other hand, the driver of the vehicle 12 can enjoy driving without having the comfortability impaired even when the course is being guided.

In particular, in the present embodiment, by displaying the virtual items M1 in the third display area 26 by AR-HUD as shown in FIG. 6, an entertainment element is enhanced, and it is possible to further prompt the driver to collect the virtual items M1.

Further, in the present embodiment, by displaying the virtual items M1 on the traffic jam detour route, the vehicle can be guided to the detour route without impairing the comfort of the driver.

Furthermore, in the present embodiment, by displaying the virtual items M1 on the accident-prone area detour route, the detour of the accident-prone area is promoted, and the safety can be improved.

Further, in the present embodiment, the incentive giving unit 62 calculates the points in accordance with the number of times the vehicle 12 overlaps with the virtual item M1. Then, since the incentive based on the points is given to the user, it is possible to increase the motivation of the user of the vehicle 12 toward the virtual items M1.

Further, in the present embodiment, the notification unit 60 notifies the user that the vehicle 12 has acquired the virtual item M1 and thus, the user can realize that the virtual item M1 is acquired.

In the present embodiment, as shown in FIG. 4, a configuration in which only one kind of virtual item M1 is overlapped and displayed on the map data has been described. However, the present disclosure is not limited to this. For example, as shown in the modified example of FIG. 8, a plurality of kinds of virtual items may be overlapped and displayed on the map data.

Modified Example

Figure 8:
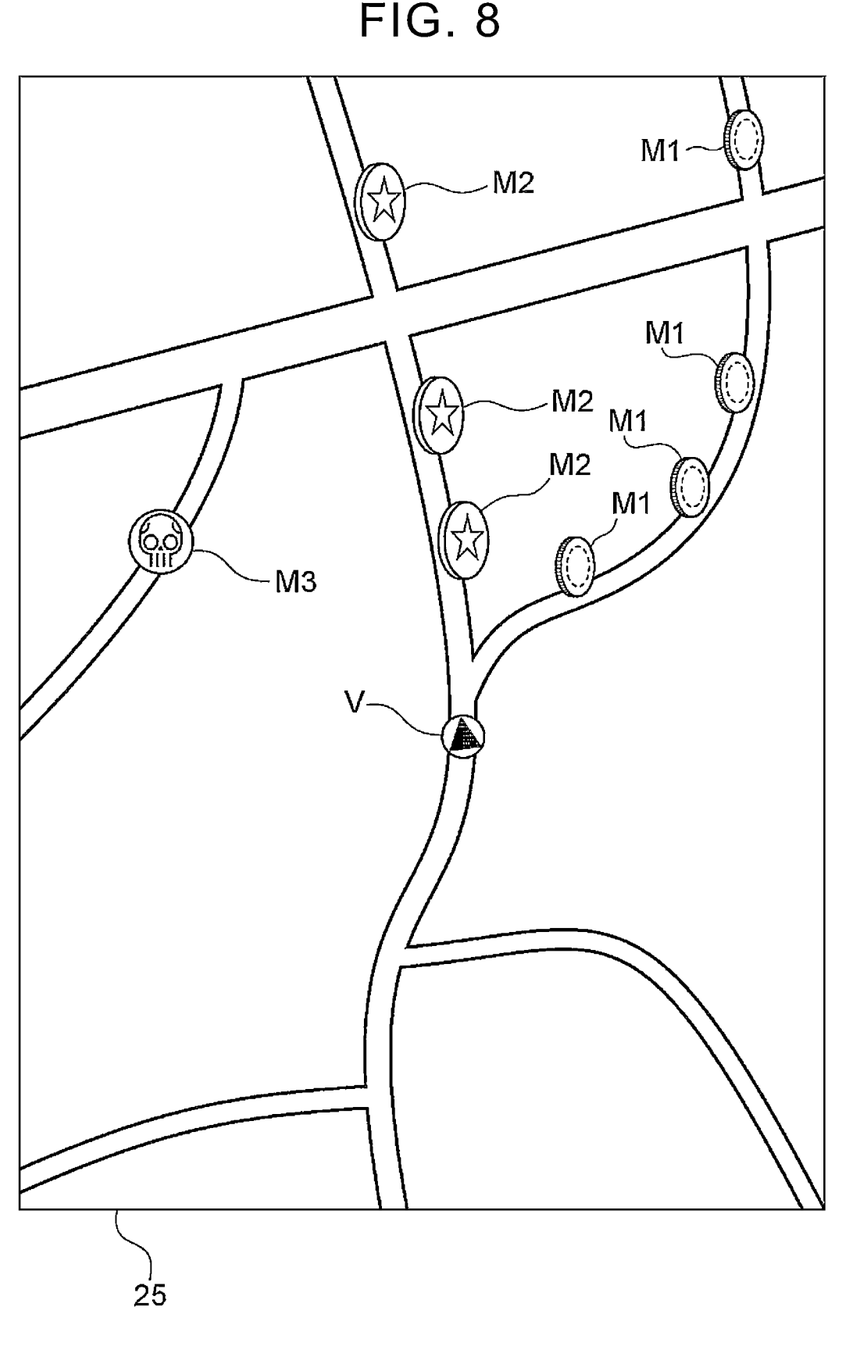
FIG. 8 is a diagram showing a display example by a center display device in a modified example.

As shown in FIG. 8, in this modification, virtual items M2 and a virtual item M3 are displayed in addition to the virtual items M1.

The virtual items M1 have the same design as those of the above embodiment, and in this modification, four virtual items M1 are overlapped and displayed along the branch travel road.

The virtual items M2 each have a different design from the virtual items M1 and each have a shape imitating a coin, and three virtual items M2 are overlapped and displayed along the main travel road. In this modification, the virtual items M2 can acquire more points than the virtual items M1.

For example, when the branch travel road on which the virtual items M1 are displayed includes an accident-prone zone, as shown in FIG. 8, the main road has a higher priority than the branch travel road. Thus, the virtual items M2 having more acquisition points are displayed on the main travel road.

On the other hand, the virtual item M3 is overlapped and displayed on the map data. The virtual item M3 has a different design from the virtual items M1 and the virtual items M2, and in this modification it is a mark imitating a skeleton, for an example.

Here, the virtual item M3 is displayed on the travel road having a remarkably low priority. For example, the virtual item M3 is displayed on a traveling road where traffic congestion frequently occurs, a traveling road in which it is prohibited to travel on a lane due to an accident vehicle before removal, an unpaved rough road, and the like. Then, the configuration may be such that when the vehicle 12 acquires the virtual item M3, a part of the acquired points may be reduced.

In this modification, the counting unit 58 counts the number of times the virtual item is acquired for each kind of virtual item. Further, the incentive giving unit 62 calculates points by multiplying by a coefficient set for each kind of virtual item. For example, the incentive giving unit 62 calculates the points by multiplying the number of times the virtual item M1 is acquired by a coefficient 1. For example, the incentive giving unit 62 calculates the points by multiplying the number of times the virtual item M2 is acquired by a coefficient 3. In this case, the points are increased by 1 point each time the vehicle 12 acquires the virtual item M1, whereas the points are increased by 3 points each time the vehicle 12 acquires the virtual item M3.

For example, the incentive giving unit 62 calculates the points by multiplying the number of times the virtual item M3 is acquired by a coefficient −5. In this case, the total points are decreased by 5 each time the vehicle 12 acquires the virtual item M3. Then, the incentive giving unit 62 notifies the user of the total value of all the calculated points as available points.

In this modification, by displaying a plurality of kinds of virtual items, it is possible to suppress the user from getting bored. Further, by selecting the kind of the virtual item in accordance with the priority of the travel road to be guided, it is possible to make the vehicle travel on the travel road on which it is desired to guide the vehicle to.

The vehicle display control device 10 in accordance with the embodiment and the modification have been described above. However, it is understood that the vehicle display control device 10 can be implemented in various modes without departing from the scope of the present disclosure. In the above embodiment, the item display unit 56 overlaps and displays a virtual item imitating a coin. However, the present disclosure is not limited to this. For example, a virtual item imitating a fruit, a virtual item imitating an animal, or the like may be displayed.

Further, in the above embodiment, when a virtual item is overlapped and displayed so that the vehicle passes by a store on a branch travel road in order to promote regional development, a discount ticket or the like that can be used at the store may be overlapped and displayed as a virtual item.

Further, various processors other than the CPU 30 may execute the display process in which the CPU 30 reads and executes the program in the above embodiment. In this case, a programmable logic device (PLD) in which a circuit configuration can be changed after manufacturing a field-programmable gate array (FPGA) or the like, and a dedicated electric circuit or the like that is a processor having a circuit configuration specially designed to execute a specific process such as an application specific integrated circuit (ASIC) is exemplified as a processor in this case. In addition, the virtual item display process may be executed by one of these various processors, or may be executed by a combination of two or more processors of the same kind or different kinds. For example, the processes may be executed by a plurality of FPGAs, a combination of the CPU and the FPGA, and the like. Further, the hardware structure of these various processors is, more specifically, an electric circuit in which circuit elements such as semiconductor elements are combined.

Further, in the above embodiment, the storage 36 is configured to store various data. However, the present disclosure is not limited to this. For example, a non-temporary storage medium such as a compact disc (CD), a digital versatile disc (DVD), and a serial bus (USB) memory may be set as a storage unit. In this case, various programs, data, and the like are stored in the above storage media.

What is claimed is:

1. A vehicle display control device, comprising:
    a map information acquisition unit configured to acquire map data around a vehicle; and
    an item display unit configured to overlap a virtual item on a predetermined travel road on the map data and display the virtual item in a display area in a vehicle cabin,
    wherein the virtual item comprises a plurality of different kinds of virtual items, and the virtual items are displayable on the item display unit based on priority of the predetermined travel road, and
    the priority of the predetermined travel road is determined based on traffic congestion information, accident information, road surface information, and requests from business operators.

2. The vehicle display control device according to claim 1, wherein
    the item display unit is configured to overlap the virtual item on a traffic jam detour route that bypasses a traffic jam.

3. The vehicle display control device according to claim 1, wherein
    the item display unit configured to overlap the virtual item on an accident-prone zone detour route that bypasses a preset route with a high accident occurrence rate.

4. The vehicle display control device according to claim 1, further comprising:
    a counting unit configured to count the number of times a current position of the vehicle on the map data overlaps with the virtual item; and
    an incentive giving unit configured to give an incentive to a user of the vehicle based on a point calculated in accordance with the number of times counted by the counting unit.

5. The vehicle display control device according to claim 4, wherein:
    the incentive giving unit configured to calculate the point by multiplying the number of times counted by the counting unit by a coefficient set for each of the kinds of the virtual items.

6. The vehicle display control device according to claim 1, further comprising:
    a notification unit configured to notify a user of the vehicle in response to a current position of the vehicle on the map data overlapping with the virtual item.

7. A vehicle display control method, comprising:
    acquiring map data around a vehicle; and
    overlapping an image imitating a virtual item on a predetermined travel road on the map data and displaying the image in a display area in a vehicle cabin,
    wherein the virtual item comprises a plurality of different kinds of virtual items, and the virtual items are displayable in the display area based on priority of the predetermined travel road, and
    the priority of the predetermined travel road is determined based on traffic congestion information, accident information, road surface information, and requests from business operators.

8. The vehicle display control device according to claim 1, wherein
    the item display unit is configured to erase a display of the virtual item in response to a current position of the vehicle overlapping with the virtual item.

9. The vehicle display control device according to claim 1, wherein
    the display area comprises a real landscape visible through a windshield of the vehicle, and the item display unit is configured to display the virtual time overlapping with the real landscape.

10. The vehicle display control device according to claim 1, further comprising:
a display position setting unit configured to set a position for displaying the virtual item in accordance with the priority of the predetermined travel road.

11. The vehicle display control device according to claim 1, wherein
the priority of the predetermined travel road based on the accident information is determined by where an accident is likely to occur is lowered, and where an accident is less likely to occur is increased.

* * * * *